(12) United States Patent
Cutler et al.

(10) Patent No.: US 8,551,330 B2
(45) Date of Patent: Oct. 8, 2013

(54) CARBON RETENTION SCREEN WITH VARIABLE DISCHARGE HEAD

(75) Inventors: Ralph A. Cutler, Centerville, UT (US); Jeffery H. Easton, Cottonwood Heights, UT (US)

(73) Assignee: WesTech Engineering, Inc., Salt Lake City, UT (US)

( * ) Notice: Subject to any disclaimer, the term of this patent is extended or adjusted under 35 U.S.C. 154(b) by 506 days.

(21) Appl. No.: 12/821,982

(22) Filed: Jun. 23, 2010

(65) Prior Publication Data

US 2010/0326920 A1 Dec. 30, 2010

Related U.S. Application Data

(60) Provisional application No. 61/220,898, filed on Jun. 26, 2009.

(51) Int. Cl.
*B01D 33/70* (2006.01)

(52) U.S. Cl.
USPC ........ 210/150; 210/151; 210/221.1; 210/255; 210/258

(58) Field of Classification Search
USPC ....................... 210/150–151, 221.1, 255, 258
See application file for complete search history.

(56) References Cited

U.S. PATENT DOCUMENTS

| 4,729,788 A | * | 3/1988 | Hutchins et al. | 423/27 |
| 4,981,598 A | | 1/1991 | Komadina | |
| 5,205,858 A | * | 4/1993 | Manke | 75/426 |

FOREIGN PATENT DOCUMENTS

WO 2008/104022 A1 9/2008

OTHER PUBLICATIONS

Satterfield, C. N., Stenger, H. G., "Fischer-Tropsch Synthesis on a Precipitated Mn/Fe Catalyst in a Well-Mixed Slurry Reactor," Ind. Eng. Chem. Process Des. Dev., 23: p. 26-29 (1984).*
International Preliminary Report on Patentability for PCT/US2010/039798, Jan. 4, 2012.
International Search Report for PCT/US2010/039798, Aug. 30, 2010.
Written Opinion for PCT/US2010/039798, Aug. 30, 2010.

* cited by examiner

*Primary Examiner* — Chester Barry
(74) *Attorney, Agent, or Firm* — Austin Rapp & Hardman

(57) ABSTRACT

A carbon adsorption vessel for use in a CIP (carbon in pulp) or CIL (carbon in leach) process may be constructed. A slurry is obtained having dissolved (leached) precious metals. The slurry is brought into contact with carbon particles and is passed through a retention screen in the vessel. The dissolved precious metals adhere onto the carbon particles. An air lift pump provides the pressure differential necessary to drive the slurry through the retention screen, wherein the carbon particles are retained by the retention screen and the slurry passes through the retention screen. After passing through the retention screen, the slurry is received in to a receiving vessel that may be situated at, below or above the level of source vessel.

17 Claims, 4 Drawing Sheets

CARBON RETENTION SCREEN WITH VARIABLE DISCHARGE HEAD

CROSS-REFERENCE TO RELATED APPLICATION

This application claims the benefit of U.S. Provisional Patent Application No. 61/220,898 filed on Jun. 26, 2009. This provisional patent application is expressly incorporated herein by reference.

TECHNICAL FIELD

The present invention relates generally to carbon adsorption as a method for the recovery of leached precious metals. More specifically, the present invention relates to a new type of carbon retention screen that may be used to recover loaded carbon particles during a carbon adsorption process.

BACKGROUND

Carbon adsorption is a widely used process for the recovery of leached precious metals from an ore. Such processes are commonly used in mining and other industries. In carbon adsorption processes, a slurry is prepared containing dissolved precious metals ions. The slurry is contacted with insoluble carbon particles, which are designed such that the dissolved precious metals adhere to the carbon particles. The solid carbon particles (with the attached precious metals) are then separated from the slurry and moves through a countercurrent series of vessels. The precious metals ions are then separated (recovered) from the fully-loaded solid carbon and converted into their desired metallic state. Once recovered, the precious metal may be sold and the barren carbon particles re-activated and re-used in the carbon adsorption process.

Carbon adsorption processes are highly effective at extracting the dissolved precious metals and are economical to operate. However, mining companies are often looking for new carbon adsorption technologies that will require less "downtime" and will allow for more efficient (and cost effective) operation of the carbon adsorption process. Accordingly, an improved carbon retention system is desirable.

BRIEF SUMMARY

The present embodiments use the principles of an air lift pump in a carbon retention process for the recovery of leached precious metals from an ore. Carbon particles are added to a slurry containing the desired leached (dissolved) precious metal(s). The leached precious metals attach to the carbon particles in the slurry. The air lift pump provides an adequate pressure differential to force the slurry through a retention screen. At the same time, the retention screen prevents the carbon particles (with the attached precious metals) from passing through the screen. In this manner, the carbon particles are separated from the other components of the slurry. By using an air lift pump to force the slurry through the retention screen, the receiving vessel (e.g., the vessel that receives the slurry after it has passed through the screen) may be situated at the same elevation (height) or at a higher elevation than the source vessel. In other embodiments, the slurry may be forced through the retention screen by an adjustable pressure (head) created by the air lift pump.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
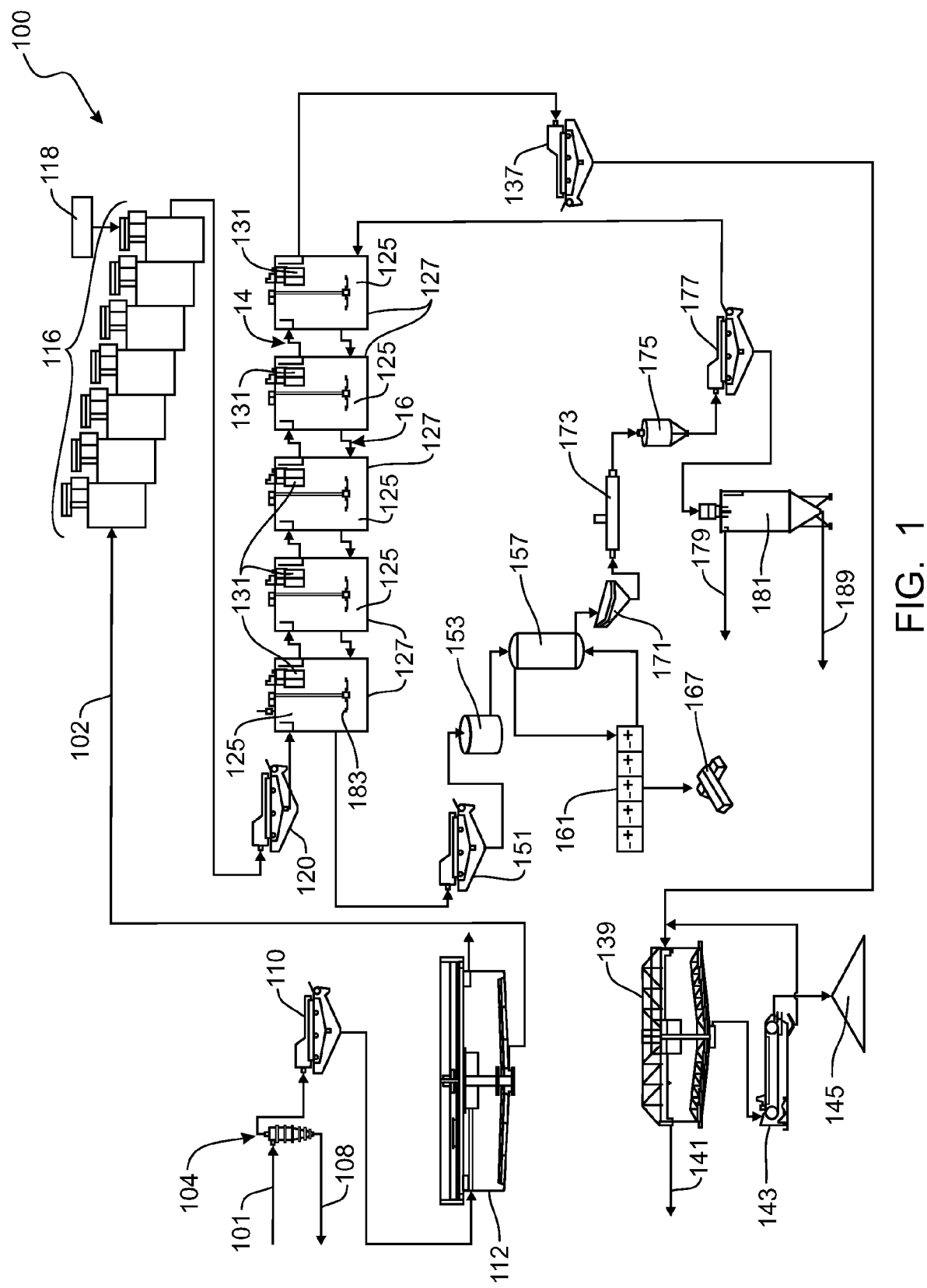
FIG. 1 is schematic diagram of a flow sheet for a Carbon In Pulp (CIP) system according to the present embodiments.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

A carbon adsorption vessel is disclosed. The vessel comprises a tank for containing a slurry, wherein the slurry comprises a quantity of leached precious metals. The vessel also includes carbon particles within the tank, wherein the precious metals are adsorbed onto the carbon particles. A retention screen is added to the vessel. The retention screen may be cylindrical in shape and may comprise a closed bottom surface. The carbon particles cannot pass through the retention screen whereas the slurry passes through the retention screen. An air lift pump is also used to provide a pressure differential that drives the slurry through the retention screen. This pressure differential may be adjustable. After passing through the screen, the slurry may exit the tank at a height that is at or above the height of the slurry in the tank. The precious metals adsorbed onto the carbon particles may be later released from the carbon particles via an elution stripping process. One or more pulsed blades may also be used to clean the carbon particles from the surface of the retention screen. One or more sensors may be used to measure the height of the slurry in the tank and the height that the screened slurry exits the tank, wherein the information from the one or more sensors may be used to adjust the amount of air flowing through the air lift pump. One or more baffles that adjust the flow of the slurry through the retention screen may also be added. A solid interior cylinder may also be positioned proximate the slurry exiting the tank.

The present embodiments also relate to a system for extraction of dissolved metals, such as precious metals. This system may be a carbon in leach system or a carbon in pulp system. The system comprises a carbon adsorption vessel, wherein the carbon adsorption vessel comprises a tank for containing a slurry, wherein the slurry comprises the dissolved metals. The vessel also comprises carbon particles within the tank, wherein the dissolved metals are adsorbed onto the carbon particles. The vessel also comprises a retention screen and an air lift pump that provides a pressure differential that drives the slurry through the retention screen. The carbon particles cannot pass through the retention screen whereas the slurry passes through the retention screen. An elution stripping vessel is also provided that separates the dissolved metals from the carbon particles. Further embodiments may be designed in which, after passing through the retention screen, the slurry exits the tank at a height that is at or above the height of the slurry in the tank. Embodiments may also be designed in which an electro-winning vessel is used to convert the dissolved metals that have been separated from the carbon particles into a solid metal. A regeneration kiln may also be provided and used in the system to regenerate the carbon particles after the dissolved metals have been separated from the carbon particles. In either a carbon-in-leach or carbon-in-pulp system, a plurality of leaching tanks may also be used through which the slurry passes before contacting the carbon adsorption vessel. In some embodiments, the system comprises a plurality of carbon adsorption vessels aligned in series. In such embodiments, the slurry moves through the plurality of carbon adsorption vessels in a first direction and the carbon particles moves through the plurality of carbon adsorption vessels in a second direction, wherein the first direction is opposite the second direction.

The present embodiments also relate to a method for separating dissolved metals from a slurry. The method comprises contacting the slurry containing the dissolved metals with carbon particles. The dissolved metals adhere to the carbon particles. The slurry and the carbon particles are placed within a carbon adsorption vessel, wherein the carbon adsorption vessel comprises a retention screen and an air lift pump. A mixer may also be used with the carbon adsorption vessel. The air lift pump provides a pressure differential that drives the slurry through the retention screen, wherein the carbon particles cannot pass through the retention screen whereas the slurry passes through the retention screen. The method also involves collecting the carbon particles that cannot pass through the screen and separating the dissolved metal from the carbon particles. The dissolved metals may be separated from the carbon particles by an elution stripping vessel. In other embodiments, the carbon adsorption vessel further comprises a tank that houses the slurry, wherein after passing through the screen, the slurry exits the tank at a height that is at or above the height of the slurry within the tank.

Carbon adsorption is a widely used process for the recovery of leached (dissolved) precious metals from an ore. In this process, the metal values are leached or dissolved from the gangue mineral body. Upon completion of leaching, the solution is considered "pregnant" or loaded with dissolved metal values. The pregnant leaching solution is then brought into contact with carbon particles where the metal values are adsorbed from the solution onto the carbon particles. The carbon particles (with the attached precious metals) are then separated from the now "barren" solution and delivered to an elution stripping system where the metal values are chemically stripped from the carbon particles. Once separated from the carbon particles, the metal values are sent for further recovery via an electro-winning process. The stripped carbon particles are then regenerated and/or reactivated in a kiln and returned to the carbon adsorption circuit for further use.

A carbon adsorption system can be configured in several different ways. The two main methods involve "Carbon In Pulp" (CIP) processing and "Carbon In Leach" (CIL) processing. Both process methods may employ a number of tanks in series where the leach slurry moves down stream and the adsorbing carbon particles move counter-current upstream. The counter-current movement may be achieved with a screening device in each tank that allows the passage of slurry but does not allow the passage of the carbon particles. The main difference between a CIP system and a CIL system involves the timing of when the leaching of the metal from the ore occurs. In a CIP system circuit, leaching of the metal occurs prior to and is independent of the carbon adsorption. The carbon absorption takes place on fully pregnant solution after the completion of metal leaching. Conversely, in a CIL circuit, leaching and carbon adsorption occur simultaneously in the same vessels. The carbon adsorption takes place while the leaching is accomplished. CIL methods help to mitigate the adsorption of metals onto organic materials in the leaching slurry rather than onto the desired carbon particles. The differences between a CIL system and a CIP system will be illustrated in connection with FIGS. 1 and 2. Specifically, FIG. 1 shows a generalized diagram of a CIP system whereas FIG. 2 shows a generalized diagram of a CIL system.

Figure 2:
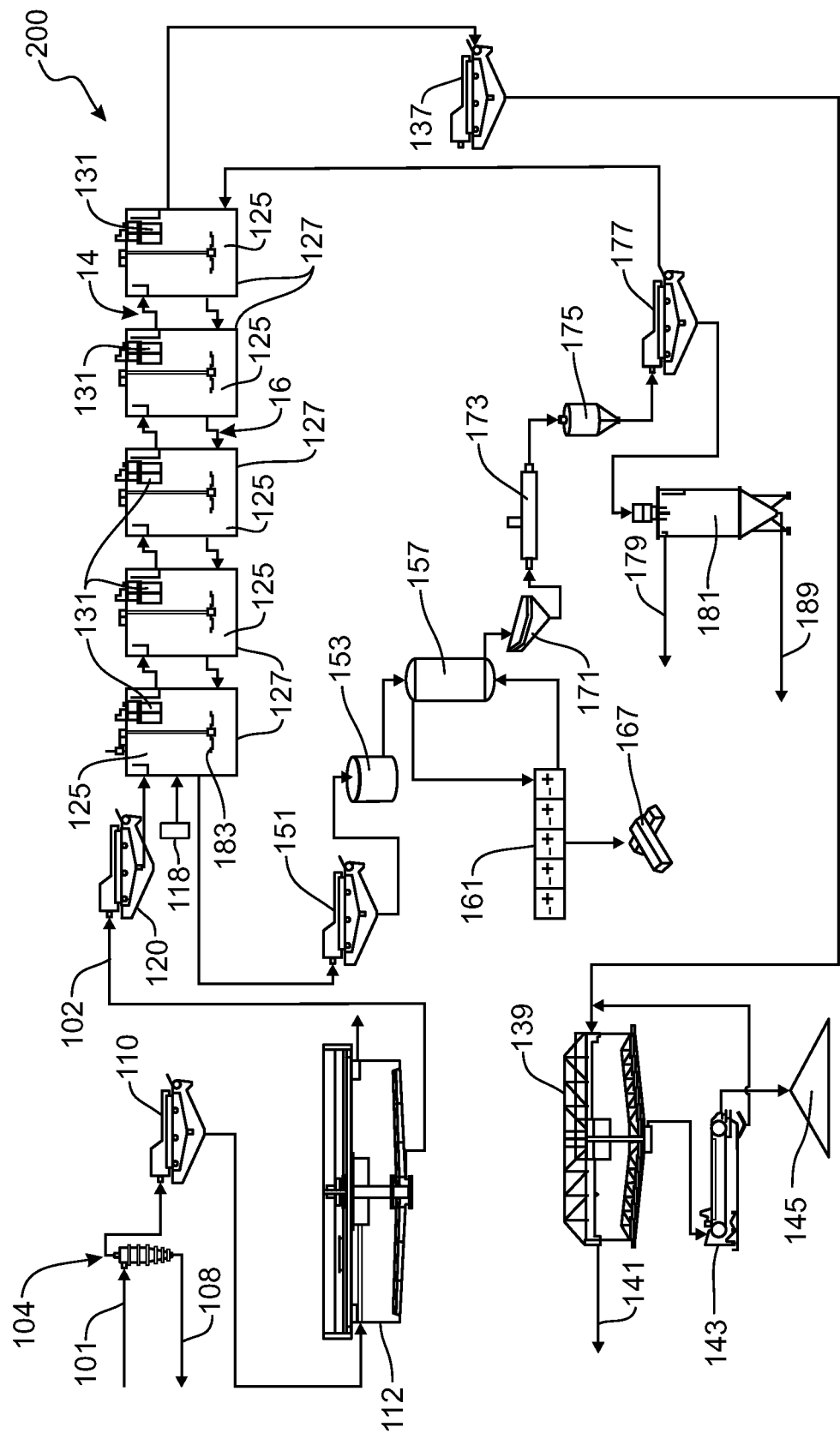
FIG. 2 is schematic diagram of a flow sheet for a Carbon In Leach (CIL) system according to the present embodiments.

Referring now to FIG. 1, a generalized diagram of a CIP system 100 is illustrated. As shown by FIG. 1, when the mined rock 101 (ore) is obtained, it may be ground into the proper size and then may be passed to a Cyclone separator 104. The purpose of this separator 104 may be to ensure that the rocks/solid materials have the appropriate (optimal) size. If the solid materials do not have the appropriate size, the oversized portion may be returned to the grinding process, as shown by arrow 108. To ensure the proper particle size and/or to remove any unwanted trash/debris from the material, an oversize/trash screen 110 may be employed. If desired, a pre-leach/grinding thickener 112 may be employed to further size the particles and/or create a slurry that will be used in the process. The purpose of the grinding, the Cyclone separator 104, the thickener 112, the screen 110, etc. is to properly size the particles for the leaching process. Those skilled in the art will appreciate that such processes are only exemplary and that a variety of processes/steps may be used (and/or omitted) to obtain the desired slurry. The optimal particle size/slurry composition may depend upon the particular metal being mined, the method of extraction of the mined ore, the soil conditions, the chemicals/reagents added, the equipment being used, etc. Accordingly, the steps taken to size the particles (if any) may be performed as a mechanism for optimizing the overall process.

Once the appropriate particles/slurry has been obtained, the slurry material may be passed (as shown by arrow 102) into one or more leaching tanks 116 which contain a quantity of leaching agent 118. The exact composition of this leaching agent 118 depends upon the particular application and the metal(s) being mined. The leaching agent 118 interacts with the metal(s) found in the particles/slurry and dissolves the metal(s) into solution. Thus, the metal(s) (or metal ions) are dissolved in the liquid phase of the slurry when the slurry exits the leaching tanks 116. The leaching agent 118 may bind and/or form a chemical complex with the metal ions. A trash screen 120 may be used to filter the liquid/slurry that is output from the leaching tanks 116. Once the liquid/slurry passes through the screen 120, it may be introduced into one or more carbon adsorption vessels 125.

As can be seen from FIG. 1, the leaching process for the metal ions occurs before the slurry is added to the carbon adsorption vessels 125—e.g., before any carbon adsorption occurs. Thus, the leaching process is independent of the carbon adsorption process. It is this independent leaching process that makes the system 100 a carbon in pulp process.

As shown in FIG. 1, the system 100 may be designed having a plurality of carbon adsorption vessels 125 aligned or arranged in series. The exact number of vessels 125 used depends upon the particular application. (A more particular description of the carbon adsorption vessel 125 is provided in FIG. 4). The carbon adsorption vessels 125 each contain a tank 127 that houses a quantity of carbon particles (not shown in FIG. 1). Multiple carbon adsorption vessels 125 (such as, for example, greater than 6 vessels) may be used depending upon the embodiment. During this process, the leached (dissolved) metals in the solution are adsorbed onto the carbon particles in these tanks 127. Such a process operates to separate the leached metals from the slurry. In other words, the leached metals adhere to the carbon particles whereas the remaining components of the slurry remain in the solution. Thus, by extracting the carbon particles (with the attached metal ions) out of the slurry, the metal ions are effectively separated out from the other components of the slurry.

In order to separate the carbon particles from the other components of the slurry, a retention screen 131 may be used. Specifically, each carbon adsorption vessel 125 comprises a retention screen 131. Multiple retention screens 131 may be used in a carbon adsorption vessel 125, as desired. The retention screen 131 may be designed (sized) such that the carbon particles cannot pass through the retention screen 131, whereas the other components (liquid or smaller solid particles) can pass through the retention screen 131. Thus, the carbon particles with the attached metal ions are separated from the other components of the slurry by the retention screen(s) 131.

As can be seen from FIG. 1, the leached slurry may move in a first direction (downstream) through the tanks 127 (as shown by arrow 14) whereas the adsorbing carbon particles may move in a second direction (counter-current upstream) through the tanks 127 (as shown by arrow 16). The first direction (downstream) is opposite the second direction (upstream). In other words, piping, conduits, connections, weirs, etc. may be used to allow the slurry to move in the first direction (downstream). Other conduits, piping, connections, weirs, etc. may further be added to allow the solid carbon particles (with the adhered metal) in the second direction (upstream).

The leached slurry/liquid from the carbon adsorption vessels 125 that is emitted from the downstream end of the series of carbon adsorption vessels may be passed through a safety screen 137 (or other filtration device) and then may be further processed by a tailings thickener 139. The tailings thickener 139 collects the solid materials and allows the solvent to be recovered for further use (as shown by arrow 141). A belt filter 143 may optionally be used to further process the solid materials. The solid materials 145 may then be collected for disposal or further treated so that they may be safely returned to the environment.

With respect to the solid carbon particles (with the adhered metal), these solid particles may be collected at the upstream end of the series of carbon adsorption vessels 125. Such solid particles may be screened, via carbon screen 151, and washed 153 with acid and/or other appropriate chemicals. (Generally, the carbon particles are fragile, brittle, etc., so these screens are used to prevent contact with the carbon particles so that they may be reused). An elution stripping process 157 may then be used. This elution stripping process 157 separates the metals from the carbon particles. Specifically, the metal is treated such that it is released from the carbon particles and returned to the eluate (solution). Once in solution, the metals may be processed by an electro-winning process in electro-winning cell 161. This electro-winning process produces a solid metal product 167. This solid metal product may be collected and smelted. Other purification, processing and/or disposition of the solid metal may also occur.

Once the metal is released from the solid carbon particles, the carbon particles may be pass through a dewatering screen 171. The carbon particles may then be regenerated for further use in a regeneration kiln 173. A quench tank 175 may be used (if necessary) as part of the regeneration process. This regeneration process produces a new batch of carbon particles that may be reused in the carbon adsorption circuit (e.g., returned to the carbon adsorption vessels 125 for further use). In order to process these carbon particles for reuse, the regenerated carbon particles may be sized through a sizing screen 177 and then collected by a thickener 181 (such as an AltaFlo thickener that is commercially available). The wastewater used in this thickener 181 may be collected and disposed of (as shown by arrow 179). Likewise, the fine (small) carbon particles 189 produced in the thickener 181 may be collected and appropriately treated (e.g., resized and enlarged into usable carbon particles or otherwise disposed of).

It should be noted that the thickeners, screens, tailing thickeners, and/or other processing units described in FIG. 1 are all commercially available and can be obtained from WesTech Engineering Inc. of Utah.

It should be noted that in some embodiments, the CIP system uses pressure (sometimes called a "head") to drive a slurry stream through the retention screens 131 (while at the same time having the carbon particles be retained). When the slurry passes through the screen 131, it enters a subsequent tank 127. In some situations, the head pressure may be achieved by setting the downstream tank 127 at a lower height or elevation than the source tank 127, thereby allowing gravity to provide the pressure gradient that pushes the slurry through the retention screen 131. A mixer 183 in each tank 127 (which mixes the contents of each tank) may be used to improve the carbon contact kinetics. However, as described herein, the carbon adsorption vessels 125 include an air lift pump (not shown in FIG. 1) that provides the pressure (head) to drive the slurry through the retention screens 131. Air is injected to the air lift pump via an air-line, which lowers the overall density of the slurry. This lower density material rises to the top of the tank 127 and passes through the retention screen 131. The use of the air lift pump allows the discharge liquid level of the receiving (downstream) tank 127 to be at or higher than the level of the source tank 127. In other words, the head caused by the air lift pump allows the elevation (height) of the receiving tank 127 to be higher or at the same height as the source tank 127.

Referring now to FIG. 2, a generalized diagram of a CIL system 200 is illustrated. The CIL system 200 is similar to the system 100 described above. In fact, the CIL system 200 includes many of the same features and elements as described above, including the carbon adsorption vessels 125. (For purposes of brevity, this discussion of similar features/elements will be omitted). The difference between the CIL system 200 and the CIP system 100 is where the leaching process occurs. As described above, the system 100 of FIG. 1 includes separate leaching tanks 116 that are positioned upstream of the carbon adsorption vessels 125. Thus, the leaching process in the CIP system 100 occurs prior to and independent of the carbon adsorption process within the carbon adsorption vessels 125. However, in the CIL system 200, there are no separate leaching tanks 116. Rather, the leaching process occurs within the carbon adsorption vessels 125—e.g., at the same time as the carbon adsorption process is occurring. (In order for this to occur, the tanks used in this process may be bigger than that which is associated with a carbon-in-pulp process). To this end, leaching agent 118 is added to one or more of the carbon adsorption vessels 125 (the location where the leaching agent 118 is added depends upon the particular embodiment). This leaching agent will leach out the metal and then the metal will be adhered to the carbon particles. Thus, the carbon adsorption vessels 125 house both the carbon adsorption process and the leaching process.

As with the system shown in FIG. 1, air lift pumps (not shown in FIG. 2) may be used to provide the pressure required to push the slurry through the retention screens 131. Accordingly, the elevation (height) of the receiving tank 127 may be higher or at the same height as the source tank 127.

Figure 3:
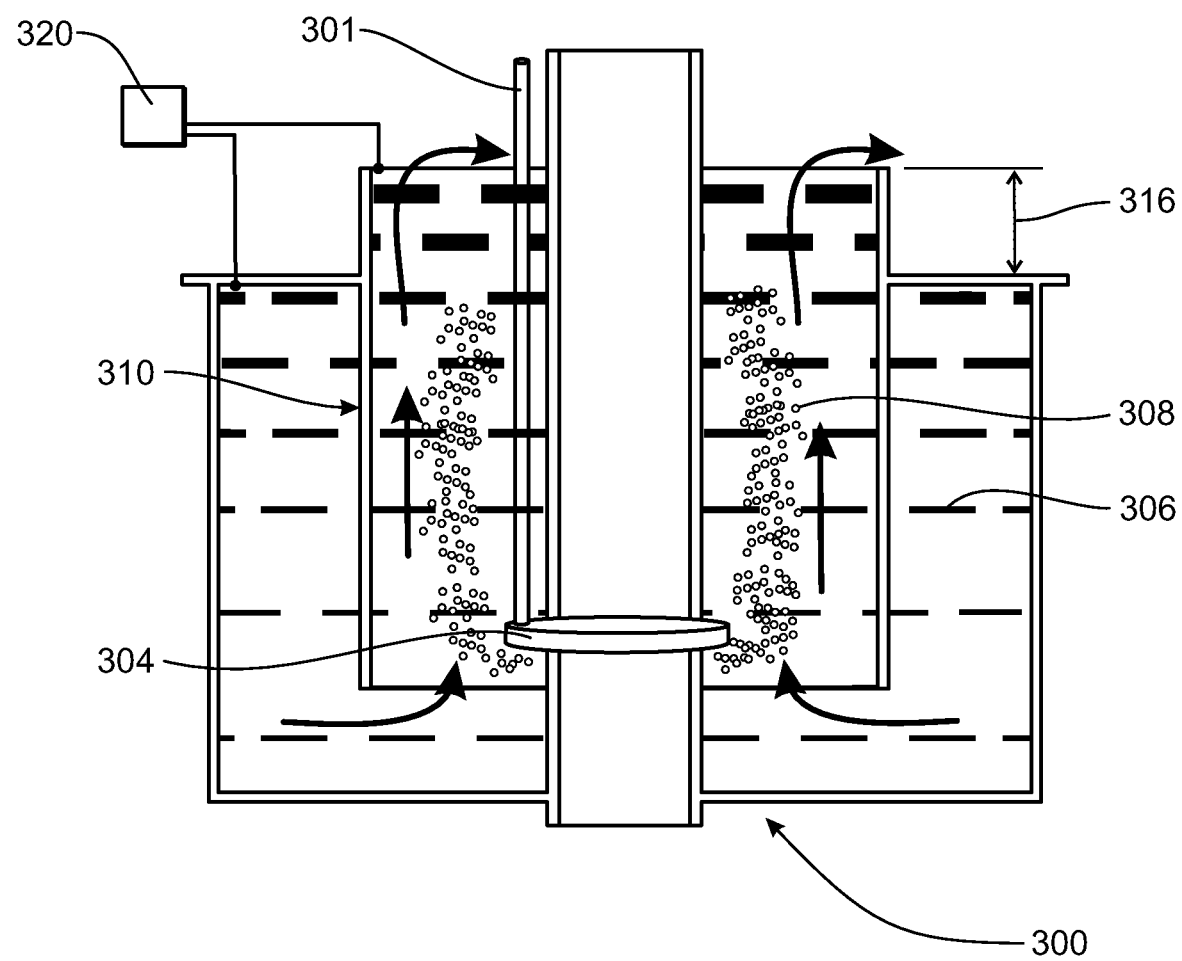
FIG. 3 is a schematic diagram of an air lift pump that may be used in the present embodiments.

Referring now to FIG. 3, a schematic diagram of an air lift pump 300 that may be used in the present embodiments is illustrated. Air lift pumps 300 are used extensively in water and waste water treatment applications. Air lift pumps achieve their pumping ability by injecting air from an air supply line 301 through a diffuser 304 into an open bottom or open side vessel. Many different air diffusers have been successfully used in air lift pumping, with the subtle differences being the air bubble size generated, the pumping capacity, and clogging/non-clogging potential of each particular air lift pumping device. For the present embodiments, all types of air lift pumps or air lift pump diffusers are usable.

In an air lift pump, a source liquid or slurry 306 is added proximate the diffuser 304. The entrained air from the diffuser 304 mixes with the liquid 308 in the pump chamber 310, lowering the apparent density of that liquid 308. The now higher density source liquid 306 outside of the chamber 310 imparts a pressure due to this density gradient and "lifts" the air entrained liquid 308 material to a higher liquid level than the surrounding area. This higher liquid level creates a head (pressure) differential (which his shown by the arrow 316). Variable flow of supply air to the diffuser 304 manipulates the apparent internal liquid density, allowing for generation of a variable discharge head as required to control flow. In other words, by varying the amount of air that is added through the diffuser 304, the head differential 316 can be modified, increased, decreased, adjusted, etc. This change in the head differential 316 will change the flow rate of the slurry. For example, if there is a larger head differential 316, more pressure will be applied such that more liquid may flow out of the pump and/or the liquid may flow out at a greater rate. Similarly, reducing the head differential 316 may reduce the amount of liquid flowing and/or may reduce the flow rate of the liquid. In this manner, the flow rate may be variable based upon the air output of the air lift pump. Generally, a sensor 320 which senses the various liquid levels and/or the head differential 316 may be used to provide the information necessary to change the air flow rate in the air lift pump and/or control the flow amount/rate.

Figure 4:
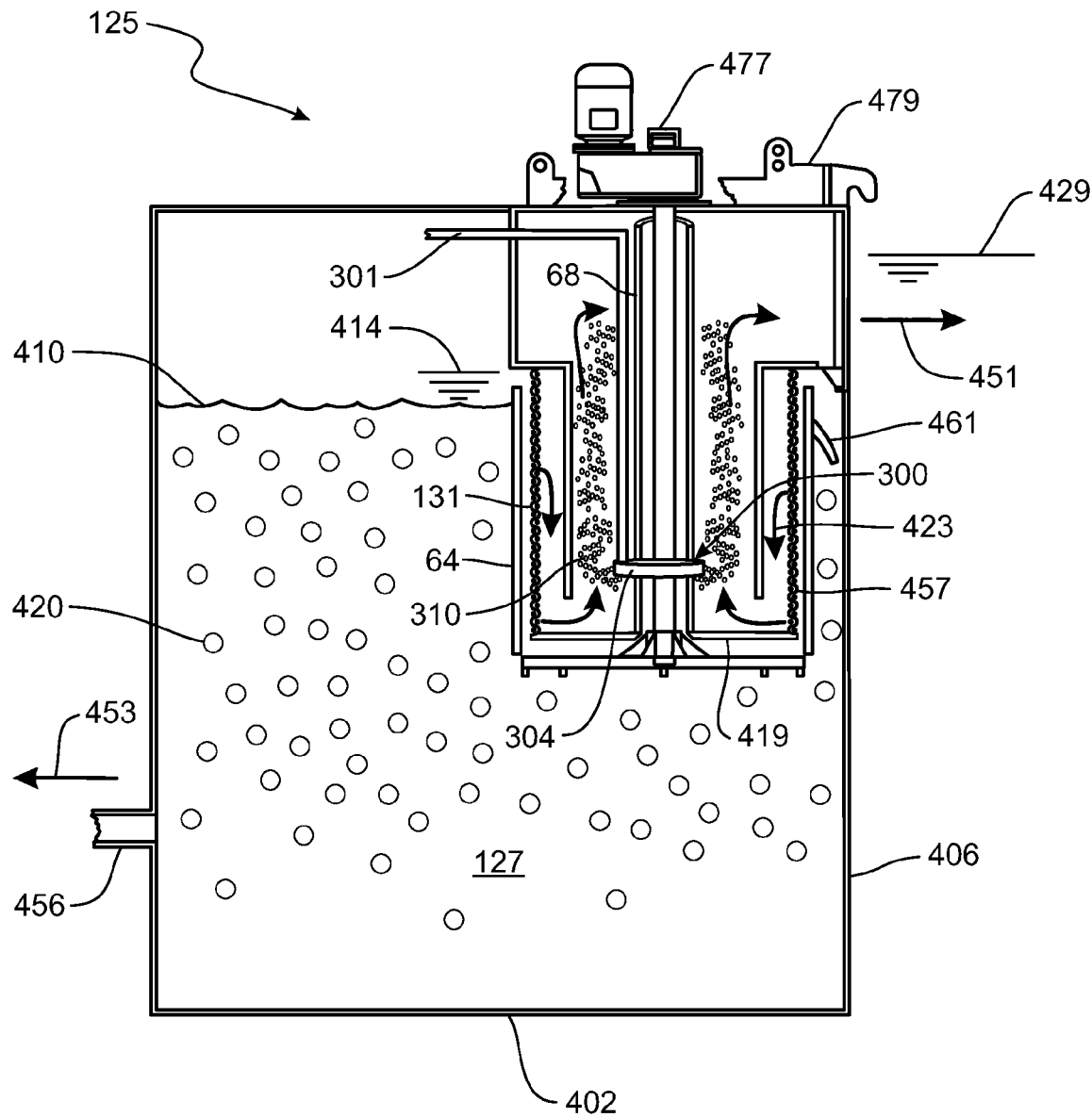
FIG. 4 is a schematic diagram of a carbon adsorption vessel incorporating an air lift pump in accordance with the present embodiments.

Referring now to FIG. 4, a schematic diagram of a carbon adsorption vessel 125 according to the present embodiments is illustrated. As can be seen from FIG. 4, the carbon adsorption vessel 125 includes a tank 127. The tank 127 includes a bottom surface 402 and one or more side surfaces 406.

The tank 127 is designed such that it may house a quantity of a slurry 410. As described herein, the slurry 410 contains the materials that have been obtained from mining an ore. The slurry 410 contains metals that have been dissolved and leached into solution by a leaching agent 118 (not shown in FIG. 4). The metals may, in some embodiments, be precious metals such as gold, silver, platinum, etc. Other materials that adhere to carbon particles fall within the definition of "metals" as used herein. The leached metals are dissolved into the slurry 410. The level of the slurry 410 in the tank 127 is shown by lines 414. The tank 127 also houses a quantity of carbon particles 420. The carbon particles 420 are solid particles that do not dissolve in the slurry 410. The carbon particles 420 may be pre-added to the tank 127 or may be premixed with the slurry 410 before the slurry 410 enters the tank 127 (the slurry 410 is generally shown as a liquid in FIG. 4; however, it will be appreciated that the slurry 410 may comprise solid materials, etc.)

The carbon particles 420 adsorb the dissolved metal ions. More specifically, the dissolved metal adheres to the solid carbon particles 420, thus removing the metal from the slurry 410. The carbon adsorption vessel 125 also includes a retention screen 131. The retention screen 131 is sized and configured such that the slurry 410 may pass through the screen 131, but the carbon particles 420 (with the adhered metal) will not pass through the retention screen 131. In some embodiments, the retention screen 131 may be cylindrical in shape and comprise a closed bottom surface 419. Other embodiments may be designed in which the retention screen 131 comprises a mesh material on the bottom surface so that the slurry 410 may pass through the bottom surface as well as the side surface(s) of the screen.

The carbon adsorption vessel 125 also includes an air lift pump 300. Air is supplied to the air lift pump 300 by an air line 301. More specifically, air (or other gas) is provided into the air lift chamber 310 by the air-line 301. Before entering the chamber 310, the air passes through the diffuser 304. Once the slurry 410 has passed through the retention screen 131, it will enter the chamber 301, as shown by arrow 423. The chamber 310 may have an open bottom that allows the slurry 410 to access the chamber 310.

The entrained air from the diffuser 304 mixes with the slurry 410 inside the pump chamber 310, lowering the apparent density of that material. The now higher density of the slurry outside the chamber 310 imparts a pressure due to this density gradient and "lifts" the slurry 410 within the chamber 310 to a higher liquid level than the surrounding area. This higher liquid level creates a head (pressure) differential. Once the slurry 410 has risen within the chamber 301, it may be discharged out of the chamber 310 and out of the tank 127. Marker 429 indicates the height at which the slurry 410 is discharged out of the tank 127. As can be seen in FIG. 4, the elevation (height) of the discharge slurry 410 may be at a higher elevation (or perhaps the same elevation) as the elevation (height) 414 of the slurry 410 within the tank 127. This difference in height is the "head" 316 (now shown in FIG. 4) that was described above.

When the slurry 410 exits the tank 127, it may flow in a first direction 451, which is downstream. If this carbon adsorption vessel 125 is one of the first carbon adsorption vessels 125 in series, the exiting slurry 410 may enter the subsequent carbon adsorption vessel 125 (as shown in FIGS. 1 and 2). If this is the last carbon adsorption vessel 125 in the series, the exiting slurry 410 may be screened by screen 137 (shown in FIG. 1) and processed in accordance with the circuit shown in FIGS. 1 and 2. As can be seen in FIG. 4, the use of the air lift pump 300, and more specifically pressure differential created by the air lift pump 300, raises the elevation of the discharge slurry so that it is at the same level or higher than the slurry in the tank 127. Additionally oxygen saturated in the slurry from the entrained and dissolved air imparted by the air lift pumping, may be beneficial to the leaching kinetics. Thus, the leaching process (especially in a CIL system) may be improved by the use of the air lift pump 300.

The carbon particles 420 cannot pass through the retention screen 131. Accordingly, the carbon particles 420 are collected in the tank 127. However, the carbon particles 420 may be allowed to flow in a second direction 453 out of the tank 127. The second direction 453 is opposite the first direction 451. In the embodiment of FIG. 4, the second direction is an upstream flow, such as via conduit 456 (or other mechanisms). If this carbon adsorption vessel 125 is not the first carbon adsorption vessel 125 in series, the exiting particles 420 will flow upstream into an adjacent carbon adsorption vessel 125 (as shown in FIGS. 1 and 2). If the carbon adsorption vessel 125 is the upstream-most vessel 125, then the exiting particles 420 will flow to screen 151 (shown in FIG. 1) which and may be further processed (in the manner described in FIGS. 1 and 2) so that the dissolved metal may be released from the carbon particles 420 and subsequently recovered. Thus, as shown in FIG. 4, the slurry 410 flows in a first direction (downstream) and the carbon particles 420 in the opposite direction (upstream). Those skilled in the art would appreciate how to construct the system so as to accomplish this flow of slurry/carbon particles.

To minimize the "pegging" (adherence) of carbon particles 420 to the exterior of the retention screen 131, a rotating blade 64 (or multiple blades) may be added to pass near the exterior surface 457 of the retention screen 131. This rotating blade 64 may create a pressure pulse (e.g., an area of lower pressure proximate the screen) allowing any pinned carbon particles 420 to release from the retention screen 131, thereby improving the flow of the slurry 410 through the retention screen 131. It should be noted that other mechanisms (including mechanical features) for screen cleaning may also be used. In some embodiments, the process(es) for cleaning the retention screen 131 remains independent of the air lift pumping system. A solid interior cylinder 68 may also be added to the carbon adsorption vessel 125 to ensure that the cross-sectional area for discharging the screened slurry 410 is sufficiently small to maintain a high enough flow velocity to keep the slurry suspended within the tank 127. The cylinder 68 may be positioned proximate the location where the slurry 410 exits the chamber 310.

In other embodiments, air from the airlift pump may be added to either the external surface of the internal surface of the screen to cause the carbon particles to be released from the screen. This process may operate to "blow off" the particles from the screen.

A stationery support 479 may also be added to help hold the tank vessel 125 in the tank 127. This support 479 may be positioned at the top of the tank 127. One or more controls 477 may be positioned proximate the support 479.

There are many variations possible with the scope of the present embodiments. For example, a supply of excess air provided by the air lift pump 300 could be used for cleaning either the interior and/or exterior surfaces of the retention screen 131. Also, the carbon adsorption vessel 125 could be easily configured with adjustable weirs (not show) for further control of the flow of slurry (or the carbon particles) into and/or out of the carbon adsorption vessel 125. Such weirs could also help to adjust the pressure (head) associated with the flow of the slurry 410. As described above, sensors could be used to measure the levels of the slurry in the carbon adsorption vessel 125, and such information regarding the height of the slurry could be used to control the flow of the air through the air lift pump 300 (and the subsequent flow of the slurry).

The carbon adsorption vessel 125 could be configured with one or more baffles 461 (or other features such as inserts) to control, regulate and/or "even out" the flow of slurry 410 across the surface of the screen media. These baffles 461 may help to mitigate wear and uneven pressure distribution on the retention screen 131. In other words, the baffles may help to prevent a disproportionate amount of the slurry from passing through a specific area of the screen. (If such occurs, this may result in an uneven wearing of the screen—e.g., an area of the screen becoming worn out faster than other areas of the screen, thereby requiring that area of the screen be unbolted from other areas of the screen and replaced). For example, the baffle 461 may be a pressure dampening baffle positioned such that it creates an area of low pressure proximate the retention screen. This area of low pressure helps to release the carbon particles from the surface of the screen. These baffles 461, which may be solid, slotted, or perforated. Those skilled in the art would appreciate how to construct and/or orient the one or more baffles 461. Other devices, such as zonal pressure drop devices, could be used to aid screen cleaning and flow through performance.

It should also be noted that the present embodiments may allow one of the carbon adsorption vessels to go "offline" without effecting the overall process. This may occur when a particular carbon adsorption vessel needs to be cleaned, maintenance or repairs are needed on the vessel, etc. Because each of the carbon adsorption vessels are positioned at the same height, a particular vessel may be bypassed (through the use of a conduit). If this occurs, the system will still operate to separate the dissolved metals. Thus, the overall process and circuit does not need to be stopped if one or more of the vessels need maintenance, thereby decreasing the downtime associated with the overall circuit.

It should also be noted that in addition to carbon particles, other types of adsorbing particles may also be used within the scope of the present embodiments. For example, "adsorbing particles" could be used in the present embodiments to leach out the dissolved metals. These absorbing particles could be, for example, carbon particles, synthetic resins, or other ion exchange media. Those skilled in the art would appreciate how these types of adsorbing particles could be used in the present embodiments.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:
1. A carbon adsorption vessel comprising:
a tank for containing a slurry, wherein the slurry comprises leached precious metals,
carbon particles within the tank, wherein the precious metals are adsorbed onto the carbon particles;
a retention screen; and
an air lift pump positioned inward of the retention screen, wherein the air lift pump provides a pressure differential that drives the slurry through the retention screen, wherein the pressure differential is caused by the air lift pump lowering the density of materials inside of the retention screen, thereby driving the slurry from outside of the retention screen to inside of the retention screen, wherein the carbon particles cannot pass through the retention screen whereas the slurry passes through the retention screen, wherein after passing through the retention screen, the slurry exits the tank at a height that is at or above the height of the slurry in the tank.

2. A carbon adsorption vessel as in claim 1, further comprising a pulsed blade that operates to clean the carbon particles from the surface of the retention screen.

3. A carbon adsorption vessel as in claim 1 further comprising a solid interior cylinder positioned proximate the slurry exiting the tank.

4. A carbon adsorption vessel as in claim 1, wherein the retention screen is cylindrical and comprises a closed bottom.

5. A carbon adsorption vessel as in claim 1, further comprising one or more sensors, wherein the one or more sensors measure the height of the slurry in the tank and the height of the slurry exiting the tank, wherein the information from the one or more sensors is used to adjust the amount of air flowing through the air lift pump.

6. A carbon adsorption vessel as in claim 1, further comprising one or more baffles that adjust the flow of the slurry through the screen.

7. A carbon adsorption vessel as in claim 1, wherein the pressure differential produced by the air lift pump is adjustable.

8. A system for extraction of dissolved metals comprising:
a plurality of carbon adsorption vessels arranged in series, wherein each of the carbon adsorption vessels comprises:
a tank for containing a slurry, wherein the slurry comprises the dissolved metals,
carbon particles within the tank, wherein the dissolved metals are adsorbed onto the carbon particles;
a retention screen; and
an air lift pump positioned inward of the retention screen, wherein the air lift pump provides a pressure differential that drives the slurry through the retention screen, wherein the pressure differential is caused by the air lift pump lowering the density of materials inside of the retention screen, thereby driving the slurry from outside of the retention screen to inside of the retention screen, wherein the carbon particles cannot pass through the retention screen whereas the slurry passes through the retention screen;
wherein each of the carbon adsorption vessels are positioned at the same height.

9. A system as in claim 8, wherein after passing through the retention screen, the slurry exits the tank at a height that is at or above the height of the slurry in the tank.

10. A system as in claim 8, wherein the slurry moves through the plurality of carbon adsorption vessels in a first direction and the carbon particles move through the plurality of carbon adsorption vessels in a second direction, wherein the first direction is opposite the second direction.

11. A system as in claim 8, further comprising a plurality of leaching tanks through which the slurry passes before contacting the carbon adsorption vessel.

12. A system as in claim 8, wherein one of the carbon adsorption vessels in the plurality of vessels is bypassed.

13. A system as in claim 8, further comprising one or more baffles that ensure an even pressure differential across the entire surface of the retention screen.

14. A system as in claim 8, further comprising a pulsed blade that produces an area of low pressure proximate the retention screen, wherein the area of low pressure operates to clean the carbon particles from the interior surface of the retention screen.

15. A system as in claim 8, wherein each of the carbon adsorption vessels are designed such that air from the airlift pump is directed to the surface of the screen.

16. An adsorption vessel comprising:
a tank for containing a slurry, wherein the slurry comprises leached precious metals,
absorbing particles within the tank, wherein the precious metals are adsorbed onto the absorbing particles;
a retention screen; and
an air lift pump positioned inward of the retention screen, wherein the air lift pump provides a pressure differential that drives the slurry through the retention screen, wherein the pressure differential is caused by the air lift pump lowering the density of materials inside of the retention screen, thereby driving the slurry from outside of the retention screen to inside of the retention screen, wherein the absorbing particles cannot pass through the retention screen whereas the slurry passes through the retention screen, wherein after passing through the retention screen, the slurry exits the tank at a height that is at or above the height of the slurry in the tank.

17. An adsorption vessel as in claim 16 wherein the adsorbing particles comprise carbon particles, synthetic resin particles, or other ion exchange media.

* * * * *